UNITED STATES PATENT OFFICE.

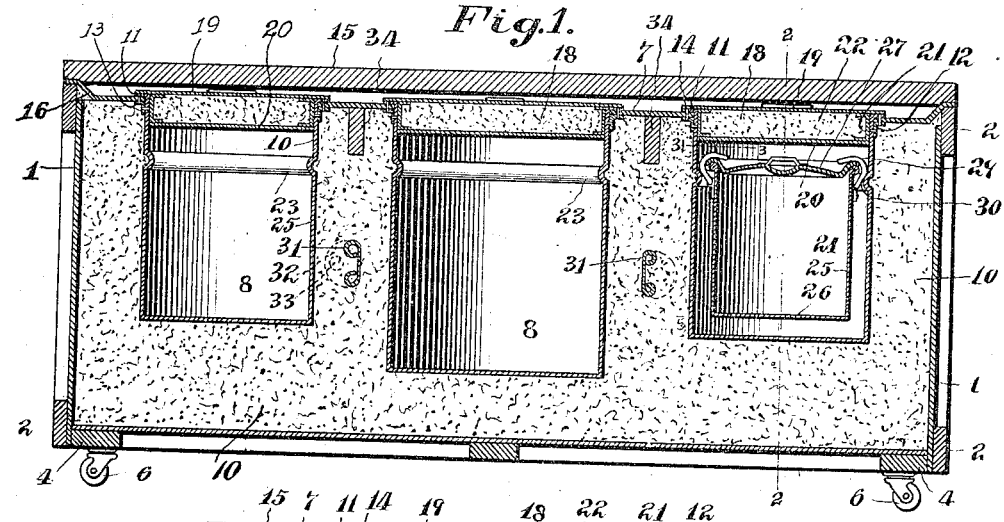
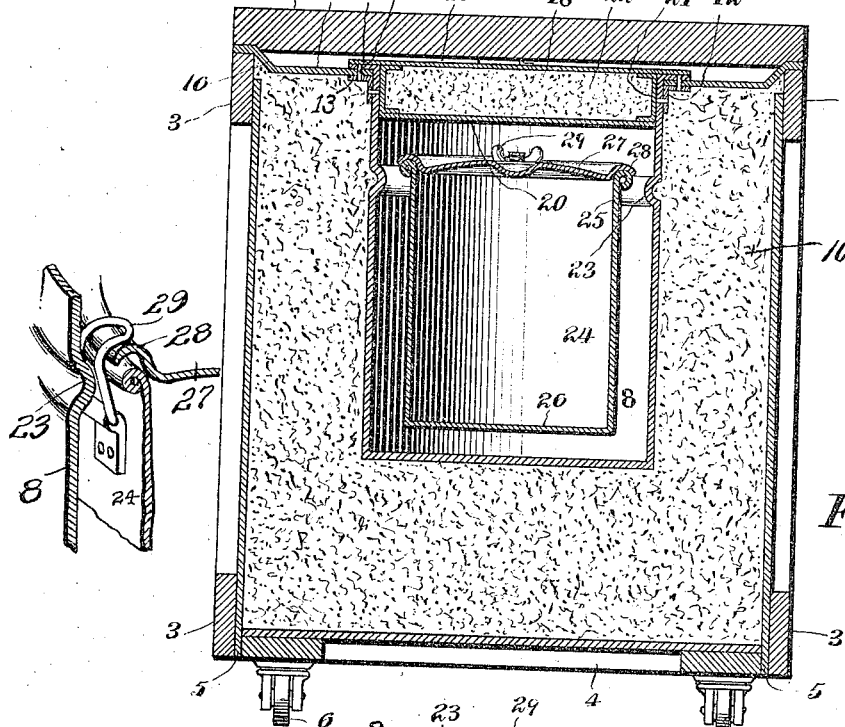
J. E. SHEAFFER.
FIRELESS COOKER.
APPLICATION FILED FEB. 4, 1911.
1,014,911. Patented Jan. 16, 1912.
Fig.1.
Fig.2.
Fig.3.
Witnesses
Thos. F. Knox,
James B. Koehl
Inventor
John E. Sheaffer
By Victor J. Evans
Attorney

JOHN E. SHEAFFER, OF WASHINGTON, DISTRICT OF COLUMBIA, ASSIGNOR TO SHEAFFER-MARION COMPANY, OF THE DISTRICT OF COLUMBIA, A CORPORATION OF SOUTH DAKOTA.

FIRELESS COOKER.

1,014,911.  Specification of Letters Patent.  Patented Jan. 16, 1912.

Application filed February 4, 1911. Serial No. 606,555.

*To all whom it may concern:*

Be it known that I, JOHN E. SHEAFFER, a citizen of the United States, residing at Washington, District of Columbia, have invented new and useful Improvements in Fireless Cookers, of which the following is a specification.

This invention relates to fireless cookers.

In fireless cookers it has been found that through great contact of the walls of the pot with the walls of the receptacle placed therein the principal object of retaining the heat has been destroyed, the heat of the pot being transmitted to the walls of the receptacle and from the latter to the non-heat conducting material.

It is an object of the present invention to remove to a great extent this objection, preventing the rapid absorption of the heat by providing means whereby only small portions of the receptacle are in contact with the walls of the pot-container.

In the drawing, forming a portion of this specification and in which like numerals of reference indicate similar parts in the several views:—Figure 1 is a vertical section through my improved fireless cooker. Fig. 2 is a vertical section therethrough taken on line 2—2 of Fig. 1. Fig. 3 is a horizontal section on line 3—3 of Fig. 1. Fig. 4 is a sectional perspective view of a portion of the cooking vessel and the cooking vessel container showing the latch for supporting the cooking vessel in the container.

My improved fireless cooker comprises an inner casing 8 and an outer casing 1 braced exteriorly by the end bars 2 and the side bars 3, the said side and end bars being suitably secured to the walls of the casing 1, as is obvious. The bottom brace members 4 are secured to the underside of the bottom of the casing member and are embraced by the depending portions 5 of the end and side walls of the casing. The said members 4 have mounted thereon suitable supporting casters 6 of any well known construction. A top member 7 wholly closes the upper end of the space between the casings 1 and 8. The inner casing 8 forms a pot container. Each container is identically constructed, being spaced throughout from the walls of the casing 1 and being wholly surrounded by non-heat conducting material 10 which may be mineral wool, wood fiber or both, or any suitable material which may be found best adapted for the purpose of thoroughly insulating the walls of the pot-containers from the walls of the casing 1. Each container is preferably provided at its upper open end with a continuous supporting flange 11 and beneath the flange the receptacle is provided with a circular clamping member 12, preferably of angle iron construction, being provided with a horizontal flange 13 which is disposed directly beneath the flange 11 and connected therewith by means of rivets 14 or other suitable fastening devices. The flanges 11 and 13 embrace the top 7 so as to securely hold the pot-container suspended therefrom. A closure 15 is designed to cover the casing 1, and as illustrated, the top 7 of the casing is offset upwardly, as at 16, and formed to provide a relatively small contacting and supporting flange for the closure. This construction also holds the closure securely out of contact with the member 7 and with the closures 18 of the pot-containers. The closure 18 of each container preferably embodies upper and lower substantially disk-like members 19 and 20 which are connected with each other by a continuous circular flange 21, the space between the members 18 and 19 being filled with non-heat conducting material 22.

With a view of holding the cooking receptacle substantially wholly out of contact with the walls of the pot-container, I provide the container near the upper end thereof with an inwardly presented continuous supporting bead 23. The cooking receptacle 24 shown to the right in Fig. 1 is provided with vertical side walls 25 and a horizontal bottom 26. A cover 27 is removably fitted to the upper open end of the receptacle and it is formed to provide a peripheral supporting portion 28 which fits over the upper edge of the walls 25, being held closed thereagainst by suitable latch members 29 attached to the upper part of the receptacle 24. These latch members extend outwardly beyond the walls 25 and are designed to present contacting portions 30 which are relatively small or narrow, being adapted to contact with the supporting bead 23 so as to hold the cooking receptacle securely suspended within the container with its walls substantially wholly spaced therefrom.

To hold the walls of the casing 1 against expansion under swelling of the material 10, I provide transversely extending horizontally disposed brace members 31. These members are formed at their ends to provide attaching ears 32 which are secured to the side walls of the casing by means of suitable fastening devices 33. As an additional means guarding against separation or expansion of the walls of the casing under expansion of the material 10, I provide near the top of the casing similar transversely disposed braces 34. These braces are arranged directly beneath the top member 7 of the casing and they operate to prevent sagging of the top member under the weight of a pot when placed in the container.

On reference to the figures of the drawing, it will be observed that when the pot or cooking receptacle 24 is operatively positioned in the pot-container 8 the upper edge of the cooking receptacle or pot will be wholly out of contact with the supporting bead 23 so as to form a continuous annular space between the pot-container and the cooking receptacle. In view thereof, the heat of the cooking receptacle or pot will be held against rapid absorption by the pot-container. This construction is such that the space above the cooking receptacle is in direct communication with the space beneath the bottom of the receptacle and the space surrounding the receptacle, consequently allowing for a thorough distribution of the heat at all points in the cooking vessel supporting receptacle.

I claim:—

1. A cooker of the class described comprising an insulated cooking vessel container, a closure therefor, a continuous supporting bead stamped from the walls of the container and extending horizontally thereinto, a cooking vessel removably mounted in the container, a closure therefor, and means on the vessel having clamping engagement with the closure therefor and having engagement with the bead of the vessel container so as to hold the walls of the vessel spaced from the walls of the container.

2. A cooker of the class described comprising an insulated cooking vessel container, a closure therefor, the said container having an inwardly extending supporting portion disposed horizontally and located between the ends of the container, a cooking vessel removably mounted in the container, and movable devices on the vessel having engagement with the supporting member of the vessel container to hold the walls of the vessel spaced throughout from the walls of the container.

3. A cooker of the class described comprising an insulated cooking vessel container, a closure therefor, a supporting element extending into the container, a cooking vessel removably mounted in the container, a cover for the vessel, and clamping devices carried by the vessel and having clamping engagement with the cover of the vessel and engaging the supporting element of the container to hold the upper end of the vessel spaced from the supporting element.

In testimony whereof I affix my signature in presence of two witnesses.

JOHN E. SHEAFFER.

Witnesses:
BENNETT S. JONES,
JAMES A. KOEHL.